United States Patent [19]

Hammer et al.

[11] Patent Number: 4,728,673
[45] Date of Patent: Mar. 1, 1988

[54] PROCESS FOR THE FOAMING OF THERMOPLASTICS CONTAINING ESTER AND/OR CARBONATE GROUPS

[75] Inventors: Heinz Hammer, Cologne; Klaus Kircher, Leverkusen, both of Fed. Rep. of Germany

[73] Assignee: Bayer Aktiengesellschaft, Leverkusen, Fed. Rep. of Germany

[21] Appl. No.: 5,536

[22] Filed: Jan. 20, 1987

[30] Foreign Application Priority Data

Jan. 24, 1986 [DE] Fed. Rep. of Germany ....... 3602014

[51] Int. Cl.[4] .............................................. C08J 9/10
[52] U.S. Cl. ....................................... 521/85; 521/90; 521/92; 521/180; 521/182; 521/909
[58] Field of Search ................... 521/90, 180, 182, 85, 521/92, 909

[56] References Cited

U.S. PATENT DOCUMENTS 3,442,829  5/1969  Moore et al. ........................ 260/2.5
3,725,321  4/1973  Wirth et al. ........................... 260/2.5
3,779,954  12/1973 Wirth et al. ........................... 260/2.5
4,097,425  6/1978  Niznik .................................. 260/2.5

FOREIGN PATENT DOCUMENTS 2218328  10/1973  Fed. Rep. of Germany .

OTHER PUBLICATIONS

The Condensed Chemical Dictionary, 9th Edition, revised by Gessner G. Holly–p. 856.
Angewandte Chemie, 64, 1952, pp. 65–76.

Primary Examiner—Morton Foelak
Attorney, Agent, or Firm—Gene Harsh; Joseph C. Gil; Aron Preis

[57] ABSTRACT

The present invention relates to the use of combinations of specific compounds as blowing agent combinations for thermoplastics containing ester and/or carbonate groups, a process for the foaming of these thermoplastics, and the foams obtained by the process according to the invention.

11 Claims, No Drawings

PROCESS FOR THE FOAMING OF THERMOPLASTICS CONTAINING ESTER AND/OR CARBONATE GROUPS

It is known that foams can be prepared from thermoplastics by incorporating an organic blowing agent into the plastic or by dusting a plastic granulate with a blowing agent which decomposes, evolving a gas, at the temperatures at which the plastic softens plastically.

To this purpose, various types of compounds have been proposed (see, for example, Angewandte Chemie 64, (1952) pages 65–76).

The blowing agent should either decompose completely to form gaseous cleavage products or the non-gaseous decomposition products should be soluble in the plastic. Above all, they may not lead to discolouration phenomena or disadvantageous alterations of the physical properties of the plastic.

Industrially, azodicarbonamide is frequently employed at present. The decomposition gases contain, inter alia, ammonia gas, which can lead to corrosion of the metal moulds and other parts of the apparatus, and also to odour nuisances.

Other examples of blowing agents which are used, in particular, at high temperatures are 5-phenyltetrazole, benzamides and dihydrooxadiazinones, which are described in U.S. Pat. Nos. 3,442,829, 3,779,954 and 4,097,425.

The use is also known of 2,4-dioxo-1,2-dihydro-4H-benzoxazines of the general formula I

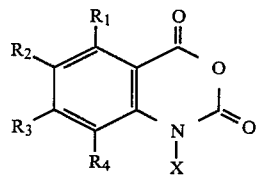
(I)

in which $R_1$ to $R_4$, identically or differently, denote hydrogen, straight-chain or branched alkyl radicals having 1 to 4 carbon atoms, hydroxyl or nitro groups, or halogen atoms, and $R_2$, in addition, further denotes a molecular radical of the following formula

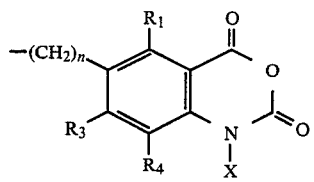

where n can vary from 0–4, the radicals $R_1$, $R_3$ and $R_4$ have the abovementioned meaning and X denotes hydrogen or straight-chain or branched alkyl radicals having 1–4 carbon atoms, for the preparation of foams from thermoplastics. (See for example, DE-OS No. 2,126,146.)

The foaming of plastics using gas-evolving compounds of the formula I is, in practice, only possible with limitations. The process parameters in an industrial foaming reaction are determined by the polymers to be foamed, by the processing plant available and by the geometry of the mouldings to be produced; the fixed decomposition temperatures of the compounds of the general formula I are usually relatively high, and the evolution of gas is frequently too slow. Their use as blowing agents therefore requires a higher temperature level for quicker and more complete evolution of gas, but, as a rule, this is either impracticable and cannot therefore be carried out or leads to increased costs and instrumental complexity. In general, an increase in temperature simultaneously causes increased materials damage during the foaming using decomposition blowing agents.

German Patent Specification No. 2,218,328 describes the use of a combination of 2,4-dioxo-1,2-dihydro-4-H-benzoxazines and auxiliary blowing agents which comprise compounds which evolve or contain acidic or basic components for the preparation of cellular or porous plastic articles. The decomposition temperature of the compounds of the formula I is reduced by adding the auxiliary blowing agents.

It has now been found that neutral salts of the general formula II, $$A_pEF_q \quad (II)$$

which cannot be decomposed at processing temperatures up to 400° C. and, as a result, do not evolve any basic or acidic components, reduce the decomposition temperatures of 2,4-dioxo-1,2-dihydro-4-H-benzoxazines to a level which is relevant practically and thus enable foam mouldings with a cellular or porous foam structure to be obtained at the process parameters which are customary in practice.

The present invention therefore relates to the use of the compounds of the general formula (I) in combination with compounds of the general formula (II) for the production of foam mouldings from thermoplastics containing ester and/or carbonate groups.

The present invention also relates to a process for the preparation of cellular or porous foams from thermoplastics containing ester and/or carbonate groups which is characterized in that compounds of the general formula I

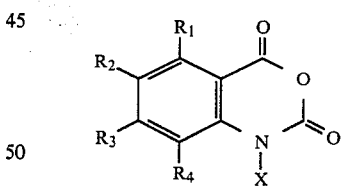

in which $R_1$ to $R_4$, identically or differently, denote hydrogen, straight-chain or branched alkyl radicals having 1 to 4 carbon atoms, hydroxyl or nitro groups or halogen atoms, and $R_2$, in addition, further denotes a molecular radical of the following formula

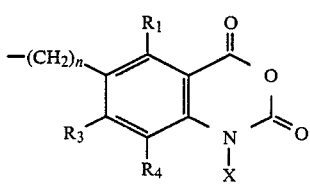

in which
  n can vary from 0–4, the radicals
  R₁, R₃ and R₄ have the abovementioned meaning and
  X denotes hydrogen or straight-chain or branched alkyl radicals having 1–4 carbon atoms, in combination with compounds of the general formula II $$A_pEF_q \qquad (II)$$

in which
  A denotes an element of the first main group of the periodic system,
  E denotes an element of the third, fourth or fifth main group or subgroup of the periodic system,
  F represents fluorine,
  p can vary from 1–3 and
  q can vary from 4–6, depending on the valency of the elements E,
are incorporated into the thermoplastics containing ester and/or carbonate groups above their melt temperature, but at maximum of 240° C., or are dusted onto the granulate of these thermoplastics and are processed to foam mouldings using known processing machines at temperatures from 150° C. to 350° C., preferably from 200° C. to 300° C. (With respect to the groups of the periodic system it is to be referred to Holleman-Wiberg, Lehrbuch der anorganischen Chemie, 37–39, Auflage, Verlag Walter de Gruyter und C., Berlin 1956, Table at the end of this book. According thereto the elements Li, B, C and N represent the main groups mentioned before, and Sc, Ti and V the subgroups mentioned before.)

Examples of suitable compounds of the general formula I are: N-methylisatoic anhydride, 5-hydroxyisatoic anhydride, 5-chloroisatoic anhydride, 3,5-dichloroisatoic anhydride, 5-bromoisatoic anhydride, 3,5-dibromoisatoic anhydride, 5-nitroisatoic anhydride, isatoic anhydride, N-ethyl-5-chloroisatoic anhydride, N-methyl-5-nitroisatoic anhydride, 5-methylisatoic anhydride, 5-ethylisatoic anhydride, 5-n-propylisatoic anhydride, 5-isopropylisatoic anhydride, 5-tert.-butylisatoic anhydride, 4-methylisatoic anhydride, 4-ethylisatoic anhydride, 4-n-propylisatoic anhydride, 4-isopropylisatoic anhydride, 4-n-butylisatoic anhydride, 4-isobutylisatoic anhydride, 4-tert.-butylisatoic anhydride, bisisatoic anhydride and methylene-bis-isatoic anhydride.

The following are used preferably: Isatoic anhydride, 5-chloroisatoic anhydride and 5-nitroisatoic anhydride.

The compounds of the formula I are employed in amounts from 0.01 to 20% by weight, preferably 0.1 to 10% by weight, very preferably in amounts from 0.1 to 3% by weight, relative to the weight of thermoplastic.

Representatives of the compounds having the general formula II which may be mentioned are: Sodium or potassium tetrafluoroborate, sodium or potassium hexafluorophosphate, dilithium or disodium or dipotassium hexafluorotitanate, disodium or dipotassium hexafluorozirconate, potassium hexafluorostannate and sodium hexafluoroantimonate.

Preferred compounds are sodium tetrafluoroborate, potassium tetrafluoroborate and dipotassium hexafluorotitanate.

The compounds of the general formula II are employed in amounts from 0.01 to 3% by weight, preferably 0.05 to 1% by weight, relative to the weight of thermoplastic.

The compounds of the general formula II are to date already known as flame retardants for polycarbonates (see, for example, DE-OS (German Published Specification) No. 2,149,311 (Le A 13 999) and DE-OS (German Published Specification) No. 2,800,923 (Mo 1694).

In addition, the alkali metal salts of fluoroboric acid are known as transesterification catalysts for the preparation of polycarbonates and as stabilizers for polycarbonates (see U.S. Pat. No. 3,625,920).

It was thus not obvious that the compounds of the formula II favour the decomposition of the blowing agent in the present context.

Thermoplastics, containing ester and/or carbonate groups, which can be foamed according to the invention are those polymers which contain these groups for the formation of the polymer chain and not merely as side groups of the polymer chain, in other words preferably thermoplastic aromatic polyesters, thermoplastic aromatic polyester carbonates, and mixtures of these thermoplastics mentioned.

Suitable thermoplastic, aromatic polycarbonates which are to be foamed according to the invention are the polycondensates which can be obtained by reaction of diphenols, particularly of dihydroxydiarylalkanes, with phosgene or diesters of carbonic acid, those also being suitable, apart from the unsubstituted dihydroxydiarylalkanes, whose aryl radicals carry methyl groups or halogen atoms in the o- and/or m-position to the hydroxyl group. Branched polycarbonates are also suitable.

The polycarbonates to be foamed have mean weight average molecular weights $\bar{M}w$ between 10,000 and 100,000, preferably between 20,000 and 40,000, determined by measurement of the relative viscosity in $CH_2Cl_2$ at 25° C. and a concentration of 0.5 g/per 100 ml.

Suitable diphenols are, for example, hydroquinone, resorcinol, 4,4′-dihydroxydiphenyl, bis-(hydroxy-phenyl)alkanes such as, for example, $C_1$–$C_8$-alkylene- or $C_2$–$C_8$-alkylidene bisphenols, bis-(hydroxyphenyl)-cycloalkanes such as, for example, $C_5$–$C_{15}$-cycloalkylene- or $C_5$–$C_{15}$-cycloalkylidene bisphenols, bis-(hydroxy-phenyl)sulphides, ethers, ketones, sulphoxides or sulphones. Furthermore α,α′-bis-(hydroxyphenyl)-diisopropyl-benzene, and the corresponding nuclear-alkylated or nuclear-halogenated compounds. Polycarbonates based on 2,2-bis-(4-hydroxyphenyl)-propane, 2,2-bis-(4-hydroxy-3,5-dichlorophenyl)-propane, 2,2-bis-(4-hydroxy-3,5-dimethylphenyl)-propane, 2,2-bis-(4-hydroxy-3,5-dibromophenyl)-propane, 1,1-bis-(4-hydroxy-phenyl)-cyclohexane and based on trinuclear bisphenols such as α,α′-bis-(4-hydroxyphenyl)-p-diisopropylbenzene are preferred.

Further bisphenols which are suitable for the preparation of polycarbonates, and also the preparation of polycarbonates, are described, for example, in U.S. Pat. Nos. 3,028,365, 3,062,781, 3,148,172, 3,271,367 and 3,275,601.

Suitable thermoplastic, aromatic polyesters which are to be foamed according to the invention are those which are built up from aromatic dicarboxylic acids and bisphenols.

Examples of preferred aromatic dicarboxylic acids are: isophthalic acid, terephthalic acid, diphenyl ether 4,4′-dicarboxylic acid and naphthalene-2,6-dicarboxylic acid. Iso- and terephthalic acid are particularly preferred.

Preferred diphenols for the preparation of the aromatic polyesters and polyester carbonates according to the invention are compounds of the formula:

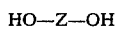 (III)

in which
Z denotes a divalent mono- or polynuclear atomatic radical having 6-30 C atoms, Z being constructed in such a fashion that each of the two OH groups is bonded directly to a C atom of an aromatic system.

Particularly preferred diphenols are compounds of the formula IV

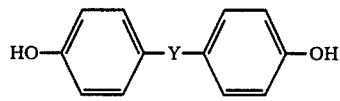 (IV)

in which
Y denotes a single bond, an alkylene or alkylidene radical having 1-7 C atoms, a cycloalkylene or cycloalkylidene radical having 5-12 C atoms,

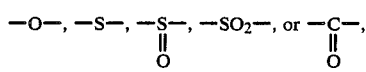

and also their nuclear-alkylated and nuclear-halogenated derivatives, for example
hydroquinone,
resorcin,
dihydroxydiphenyls,
bis-(hydroxyphenyl)-alkanes,
bis-(hydroxyphenyl)-cycloalkanes,
bis-(hydroxyphenyl)ethers,
bis-(hydroxyphenyl)ketones,
bis-(hydroxyphenyl)sulphoxides,
bis-(hydroxyphenyl)sulphones and
α,α'-bis-(hydroxyphenyl)-diisopropylbenzenes,
and also their nuclear-alkylated and nuclear-halogenated derivatives.

The most important diphenols are: bisphenol A, tetramethylbisphenol A, 1,1-bis-(4-hydroxyphenyl)-isobutane, 1,1-bis-(4-hydroxyphenyl)-cyclohexane, 4,4'-dihydroxydiphenyl sulphide, 4,4'-dihydroxydiphenyl sulphone, and also their di- and tetrahalogenated derivatives. Bisphenol A is particularly preferred. Any mixtures of the diphenols mentioned can also be used.

Possible branching agents are mentioned in DOS (German Published Specifications Nos.) 2,940,024 and 3,007,934.

Phenol, alkylphenols having $C_1-C_{12}$-alkyl groups, halogenated phenols, hydroxydiphenyl, naphthols, chlorocarbonates from those phenolic compounds and chlorides of aromatic monocarboxylic acids which can optionally be substituted by $C_1-C_{22}$-alkyl groups and halogen atoms are preferably used as chain terminators for the aromatic polyesters in amounts from 0.1 to 10 mol% (relative to the diphenols in the case of phenols, and relative to the acid dichlorides in the case of acid chlorides). Furthermore suitable are the chlorides of aliphatic monocarboxylic acids having up to 22 C atoms.

The chain terminators can be added, in the case of phenolic compounds, to the reaction mixture before or during the reaction. However, sufficient acid chloride must still be available for them to react and be able to limit the chain; for example, the chain terminator can be employed together with the diphenol, it can be contained in the solution of the chlorides of the aromatic dicarboxylic acids, or added to the reaction mixture after production of a pre-condensate.

If acid chlorides and chlorocarbonates are used as chain terminators, they are preferably employed together with the aromatic dicarboxylic acid chlorides. These chain terminators can still be added to the reaction mixture even at a point in time when the chlorides of the dicarboxylic acids have already substantially or completely reacted.

Aliphatic structural units, for example adipic acid or butane-1,4-diol, can be involved in the construction of the aromatic polyester, even up to 30 mol% of the dicarboxylic acids and dihydroxy compounds in each case.

Furthermore, the aromatic polyesters can be built up partly in aromatic hydroxycarboxylic acids, for example p-hydroxy-benzoic acid. The proportion of such hydroxycarboxylic acids can be up to 100 mol% (relative to bisphenol).

If iso- and terephthalic acid are involved together in the construction of the aromatic polyester, their ratio can be 1:20 to 20:1.

Suitable thermoplastic, aromatic polyester carbonates to be foamed according to the invention are polymers which are built up from the same constituents as the aromatic polyesters mentioned previously, but at least one carbonic acid derivative, preferably phosgene, is additionally involved in the construction.

The aromatic polyester carbonates can contain up to 80 mol%, preferably up to 50 mol%, of carbonate groups, relative to the sum of the ester and carbonate groups. Both the ester and the carbonate proportion of the aromatic polyester carbonate to be foamed according to the invention can be present in the form of blocks or distributed randomly in the polycondensate.

In addition to the thermoplastics, containing ester and/or carbonate groups, to be foamed, other thermoplastics in blends with the abovementioned thermoplastics can also be foamed by the process according to the invention. Examples of such other thermoplastics are polystyrenes, polymethacrylates, polyethylene terephthalates and so-called thermoplastic multi-phase plastics, such as, for example, acrylonitrile-styrene-butadiene polymers, mixtures of polystyrene with rubber-elastic copolymers or block copolymers based on butadiene, styrene, styrene-acrylonitrile copolymers with butadiene-acrylonitrile polymers. Two-phase plastics in which the hard phase based on copolymers of styrene and/or alkyl styrene and/or methyl methacrylate with acrylonitrile is modified to be impact resistant using a rubber-elastic phase based on butadiene can also be a component of the mixture. These other thermoplastics are preferably employed in amounts from less than 50% by weight, relative to the sum of the thermoplastics, to be foamed, comprising thermoplastics containing ester and/or carbonate groups and other thermoplastics.

Suitable polystyrenes are, for example, homopolymers of styrene or copolymers of styrene with, preferably, acrylonitrile and/or butadiene, and/or maleates which are obtained from the monomers or the mixture of the monomers with $\overline{M}w$ of 10,000-600,000, for example by suspension polymerisation in the presence of catalysts ($\overline{M}w$ is measured in DMF at c 5 g/l and 20° C.). (For references regarding this, see: Beilsteins Handbuch der Organischen Chemie [Beilstein's handbook of organic chemistry], 4th edition, 3rd supplement, vol. 5, pages 1163-1169, Springer Verlag 1964, H. Ohlinger, Polystyrol [polystyrene], 1st part, Preparation processes and properties of the products, Springer Verlag 1955).

Suitable polymethacrylates are, for example, $C_1$–$C_4$-alkylmethacrylate polymers, in other words polymers of methyl-, ethyl-, propyl-, and -butylmethacrylates, preferably of methyl- and ethyl-methacrylate. Both homopolymers and copolymers of these methacrylates are to be understood. In addition, up to a maximum of 9.5% by weight of other ethylenically unsaturated, copolymerisable monomers, in each case relative to total weight of these unsaturated monomers and the methacrylates of the polymethacrylates, can be copolymerised, so that the $C_1$–$C_4$-alkylmethacrylate polymers which are suitable according to the invention are built up from 90.5% by weight to 100% by weight of alkylmethacrylate units and from 9.5% by weight to 0% by weight of other ethylenically unsaturated monomer units.

Other ethylenically unsaturated copolymerisable monomers are, for example, (meth)acrylonitrile, (α-methyl)styrene, bromostyrene, vinyl acetate, $C_1$–$C_8$-alkyl acrylate, aryl(meth)acrylate, (meth)acrylic acid, ethylene, propylene, N-vinylpyrrolidone, vinylsulphonic acid (salts) or styrenesulphonic acid (salts).

The polymethacrylates which are suitable according to the invention are substances which are soluble in certain organic solvents and thus have a linear or branched construction; gel-containing polymers, i.e. those with crosslinked structures, are not subsumed amongst these.

The polymethacrylates can be prepared by known polymerisation processes, but preferably by free-radical or thermal polymerisation. Suitable polymerisation processes are processes in emulsion, bulk, suspension or dispersion, particularly emulsion, but preferably bulk or solution polymerisation. The molecular weights of the polymethacrylates can be varied within a broad range by known measures depending on the process, for example by use of mercaptans as regulators. Conventionally, the polymethacrylates which can be employed according to the invention have molecular weights (or Staudinger indices, or melt viscosities) which make their thermoplastic processing by injection moulding or extrusion appropriate.

Suitable polyalkylene glycol terephthalates are, for example, those based on ethylene glycol, propane-1,3-diol, butane-1,4-diol, hexane-1,6-diol and 1,4-bishydroxymethylcyclohexane. The molecular weights ($\overline{M}w$) of these polyalkylene glycol terephthalates are between 10,000 and 80,000. The polyalkylene glycol terephthalates can be obtained by transesterification according to known processes, for example from dialkyl terephthalate and the appropriate diol. For example, starting from a lower alkyl ester of terephthalic acid, preferably the dimethyl ester, this is transesterified using an excess of diol in the presence of suitable catalysts to form the bishydroxyalkyl ester of terephthalic acid. During this, the temperature is increased to 210°–220° C., starting from 140° C. The alcohol liberated is removed by distillation. The condensation is subsequently carried out at temperatures from 210°–280° C., the pressure being reduced stepwise to less than 1 torr, at which pressure the excess diol is removed by distillation.

The incorporation temperatures to be maintained according to the invention depend, on the one hand, on the melt temperature of the plastics to be foamed, and on the other hand may not exceed about 240° C. if premature decomposition of the blowing agent combination, to be employed according to the invention, of the compounds I+II is to be avoided.

The mixing, alternatively possible, of the mixture of compounds of I and II to be employed according to the invention, the so-called dusting, can be carried out using pulverulent compounds of I and II in a conventional fashion, for example in mixing containers provided with stirrers.

It is alternatively possible to process one or both components of the combination according to the invention in the form of a "concentrate". In this case, the components are incorporated into the thermoplastic polymer in a known fashion under the conditions mentioned above in conventional mixers such as single-screw extruders or twin-screw extruders or compounders. The two components of the blowing agent combinations can also be processed in separate "concentrates", during which the respective amount of component I or II can be varied from 1 to 20% by weight, preferably from 2 to 10%, relative to the weight of thermoplastic, but it is also possible to prepare a common blowing agent concentrate, with both components, which contains component I in amounts from 1 to 20% by weight, preferably from 2 to 10% by weight, and component II in amounts from 0.5 to 10% by weight, preferably from 1 to 5% by weight, in each case relative to the weight of thermoplastic. The blowing agent combination according to the invention can also be employed together with other, already known blowing agents. Other known blowing agents to be used concomitantly are, for example, 5-phenyltetrazol or diisopropyl hydrazinecarboxylate.

These other blowing agents to be used concomitantly are employed in amounts from 0.05 to 0.2% by weight, relative to the weight of the thermoplastic.

The conventional additives, such as stabilisers against heat and UV light, dyestuffs, pigments, plasticizers, waxes, lubricants and fillers can be added in a known fashion to thermoplastics, to be foamed, containing ester and/or carbonate groups before the incorporation of the blowing agent combination, according to the invention, of components I and II, or alternatively incorporated at the same time as the blowing agent combination to be employed according to the invention.

The foaming process according to the invention can be carried out, for example, using known processing machines, such as, for example, injection moulding machines.

The plastic foams which can be obtained according to the invention are used industrially in a wide variety of applications, particularly in the electrical field, for example as appliance or lamp covers, large-volume and large-surface-area parts being particularly important.

EXAMPLES

The process using the blowing agent combination according to the invention may be demonstrated with reference to the example of the production of foamed polycarbonate moulded articles.

The polycarbonate used in the following examples for the production of moulded foam is a polycarbonate having a medium viscosity and an average molecular weight Mw of about 29,000 or a relative solution viscosity of 1.295 in methylene chloride, at 25° C. and a concentration of 0.5 g of polycarbonate in 100 ml of methylene chloride.

It contains 5% by weight of glass as nucleating agent, one of the conventional mould release agents for better release properties, and also white and grey pigments in an amount of about 1% by weight. The moulded foam is produced in a mould measuring 30 cm×30 cm×0.6 cm having a central sprue gate and using an injection moulding machine with shut-off nozzle of the DEMAG D 430 type and a temperature setting of 260° C., 280° C., 300° C., 300° C. (nozzle). The polycarbonate to be foamed had previously been dried for 4 hours at 120° C. as usual.

The blowing agents in Examples 2, 3 and 4 were applied onto the polycarbonate in a tumble mixer.

In Examples 1, 5 and 6, separate blowing agent concentrates of the individual components were prepared (in each case 10% in the case of isatoic anhydride and 5-phenyltetrazole, 2% in the case of KBF$_4$) and premixed in the correct ratio with the polycarbonate to be foamed.

| Example No. | Blowing agent or mixture | Relative solution viscosity | Impact strength according to DIN 53453 | Remarks |
|---|---|---|---|---|
| 1 | 0.3% by weight of 5-phenyl-tetrazole | 1.257 | 35 | |
| 2 | 0.5% by weight of isatoic anhydride | 1.292 | | Mould not completely filled |
| 3 | 0.2% by weight of KBF$_4$ | 1.290 | | No foaming |
| 4 | 0.5% by weight of isatoic anhydride + 0.25% of KBF$_4$ | 1.293 | 72 | |
| 5 | 0.5% by weight of isatoic anhydride + 0.2% of KBF$_4$ + 0.1% of 5-phenyl-tetrazole | 1.276 | 36 | |
| 6 | 0.1% by weight of phenyl-tetrazole | | | Mould not completely filled |

The comparison of Example 1 and Example 4 shows that the isatoic anhydride/potassium tetrafluoroborate blowing agent mixture does not cause degradation of the polymers, whereas 5-phenyltetrazole leads to a notable reduction of the solution viscosity.

The action of the potassium tetrafluoroborate activator becomes clear by comparing Examples 2 and 4.

We claim:

1. A process for the preparation of a foamed moulding comprising using a composition including (i) a thermoplastic which is characterized in that its polymer chain contains at least one member selected from the group consisting of an ester group and a carbonate group (ii) a compound of the formula

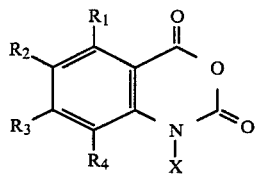

in which

R$_1$–R$_4$ independently denotes hydrogen, a straight-chain or branched alkyl radical having 1 to 4 carbon atoms, a hydroxyl or nitro group or a halogen atom, and R$_2$ may additionally denote a radical of the following formula

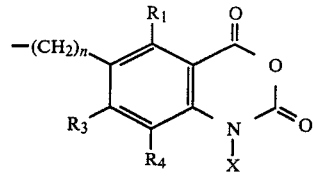

wherein n is an integer of from 0 to 4 and

R$_1$, R$_3$ and R$_4$ have the above-mentioned meaning and

X denotes hydrogen or straight-chain or branched C$_1$–C$_4$ alkyl radical and (iii) a neutral salt of the formula A$_p$EF$_q$ wherein A denotes an element of the first main group of the Periodic system, E denotes an element of the third, fourth or fifth main group or subgroup of the Periodic system, F represents a fluorine atom, p is 1, 2 or 3 and q is 4, 5 or 6 depending on the valence of said E.

2. A process according to claim 1, in which the compounds of formula (I) and (II), if desired in combination with another blowing agent, are incorporated into the thermoplastics containing ester and/or carbonate groups above their melt temperature, but a maximum of 240° C., or are dusted onto the granulate of the thermoplastics, and are processed to a foam moulding using a processing machine therefor at a temperature from 150° C. to 350° C.

3. Process according to claim 2, in which the processing to foam mouldings is carried out at temperatures from 200° C. to 300° C.

4. A process according to claim 1, in which the compound of formula (I) is selected from N-methylisatoic anhydride, 5-hydroxyisatoic anhydride, 3,5-dichloroisatoic anhydride, 5-bromoisatoic anhydride, 3,5-dibromoisatoic anhydride, N-ethyl-5-chloroisatoic anhydride, N-methyl-5-nitroisatoic anhydride, 5-methylisatoic anhydride, 5-ethylisatoic anhydride, 5-n-propylisatoic anhydride, 5-isopropylisatoic anhydride, 5-tert.-butylisatoic anhydride, 4-methylisatoic anhydride, 4-ethylisatoic anhydride, 4-n-propylisatoic anhydride, 4-isopropylisatoic anhydride, 4-n-butylisatoic anhydride, 4-isobutylisatoic anhydride, 4-tert.-butylisatoic anhydride, bisisatoic anhydride and methylene-bis-isatoic anhydride.

5. A process according to claim 1, in which the compound of formula (I) is isatoic anhydride, 5-chloroisatoic anhydride or 5-nitroisatoic anhydride.

6. A process according to claim 1, in which the compound of formula (II) is selected from sodium or potassium hexafluorophosphate, dilithium or disodium hexafluorotitanate, disodium or dipotassium hexafluorozirconate, potassium hexafluorostannate and sodium hexafluoroantimonate.

7. A process according to claim 1, in which the compound of formula (II) is sodium tetrafluoroborate, potassium tetrafluoroborate or dipotassium hexafluorotitanate.

8. A process according to claim 1, in which the compound of the formula (I) is present in an amount of 0.1 to 10% by weight, relative to the weight of thermoplastics.

9. A process according to claim 8, in which the compound of formula (I) is present in an amount of 0.01 to 3% by weight, relative to the weight of thermoplastics.

10. A process according to claim 1, in which the compound of formula (II) is present in an amount of 0.05 to 1% by weight, relative to the weight of thermoplastics.

11. A foam of a thermoplastics containing ester and/or carbonate groups whenever produced by the process of claim 1.

* * * * *